(12) United States Patent
Norton

(10) Patent No.: US 6,259,167 B1
(45) Date of Patent: Jul. 10, 2001

(54) SEAT OCCUPANT WEIGHT SENSING SYSTEM

(76) Inventor: Peter Norton, 36081 Grand River, Farmington, MI (US) 48335

( * ) Notice: Subject to any disclaimer, the term of this patent is extended or adjusted under 35 U.S.C. 154(b) by 0 days.

(21) Appl. No.: 09/112,727

(22) Filed: Jul. 9, 1998

(51) Int. Cl.[7] ................................................. B60R 21/32
(52) U.S. Cl. .......................... 307/10.1; 180/273; 340/667
(58) Field of Search ....................... 73/862.541, 862.195, 73/862.08; 340/573, 665–667; 280/735; 307/10.1, 119, 124; 180/273; 701/45

(56) References Cited

U.S. PATENT DOCUMENTS

| | | | |
|---|---|---|---|
| 5,074,583 | * 12/1991 | Fujita et al. ............................ | 280/735 |
| 5,161,820 | * 11/1992 | Vollmer ................................. | 280/735 |
| 5,502,284 | * 3/1996 | Meiller et al. ......................... | 180/273 |
| 5,525,843 | * 6/1996 | Howing ................................ | 307/10.1 |
| 5,573,269 | * 11/1996 | Gentry ................................. | 280/735 |
| 5,612,876 | * 3/1997 | Zeidler et al. ......................... | 280/735 |
| 5,720,523 | * 2/1998 | Kawabata et al. .................... | 340/667 |
| 5,739,757 | * 4/1998 | Gioutsos .............................. | 340/667 |
| 5,821,633 | * 10/1998 | Burke et al. ......................... | 307/10.1 |
| 5,848,661 | * 12/1998 | Fu ........................................ | 180/273 |
| 5,877,677 | * 3/1999 | Fleming et al. ...................... | 280/735 |
| 5,893,582 | * 4/1999 | Allen et al. ........................... | 280/735 |
| 5,967,549 | * 10/1999 | Allen et al. ........................... | 280/735 |
| 5,975,568 | * 11/1999 | Speckhart et al. .................... | 280/735 |
| 6,043,736 | * 3/2000 | Sawahata et al. .................... | 340/667 |

\* cited by examiner

Primary Examiner—Fritz Fleming

(57) ABSTRACT

A system for determining the weight of the occupant of a vehicle seat includes a hinge near the forward edge of the seat and a force sensor responsive to downward force at a point well to the rear of the hinge thereby indicating torque about the hinge. The occupant weight sensing system is particularly responsive to weight applied to the rearward part of the seat and is less responsive to weight applied to the forward edge of the seat thereby being less affected by the weight of the lower legs and feet of a normally seated adult. The force sensor is preferably of the type that converts mechanical force to fluid pressure and provides a force signal from a pressure sensor responsive to the fluid pressure. The system includes a microprocessor connected for receiving the output of the force sensor. The microprocessor may, optionally, also receive outputs from an accelerometer responsive to vertical accelerations, a seat back recline angle sensor and a seat track position sensor. In a first embodiment a seat cushion rests on a platform and the platform rotates about a hinge. The force sensor indicates the torque applied to the platform about the hinge. In a second embodiment the entire seat frame rotates about a hinge and the force sensor indicates the torque applied to the seat about the hinge. In the first embodiment the microprocessor determines the weight of the seat occupant from the outputs of the force sensor and the seat back recline sensor. In the second embodiment the microprocessor determines the weight of the seat occupant from the outputs of the force sensor, the seat back recline sensor and the seat track position sensor. The microprocessor may use an accelerometer to establish whether the force being sensed derives from seat belt tension applied to a child seat or from the weight of an adult.

31 Claims, 6 Drawing Sheets

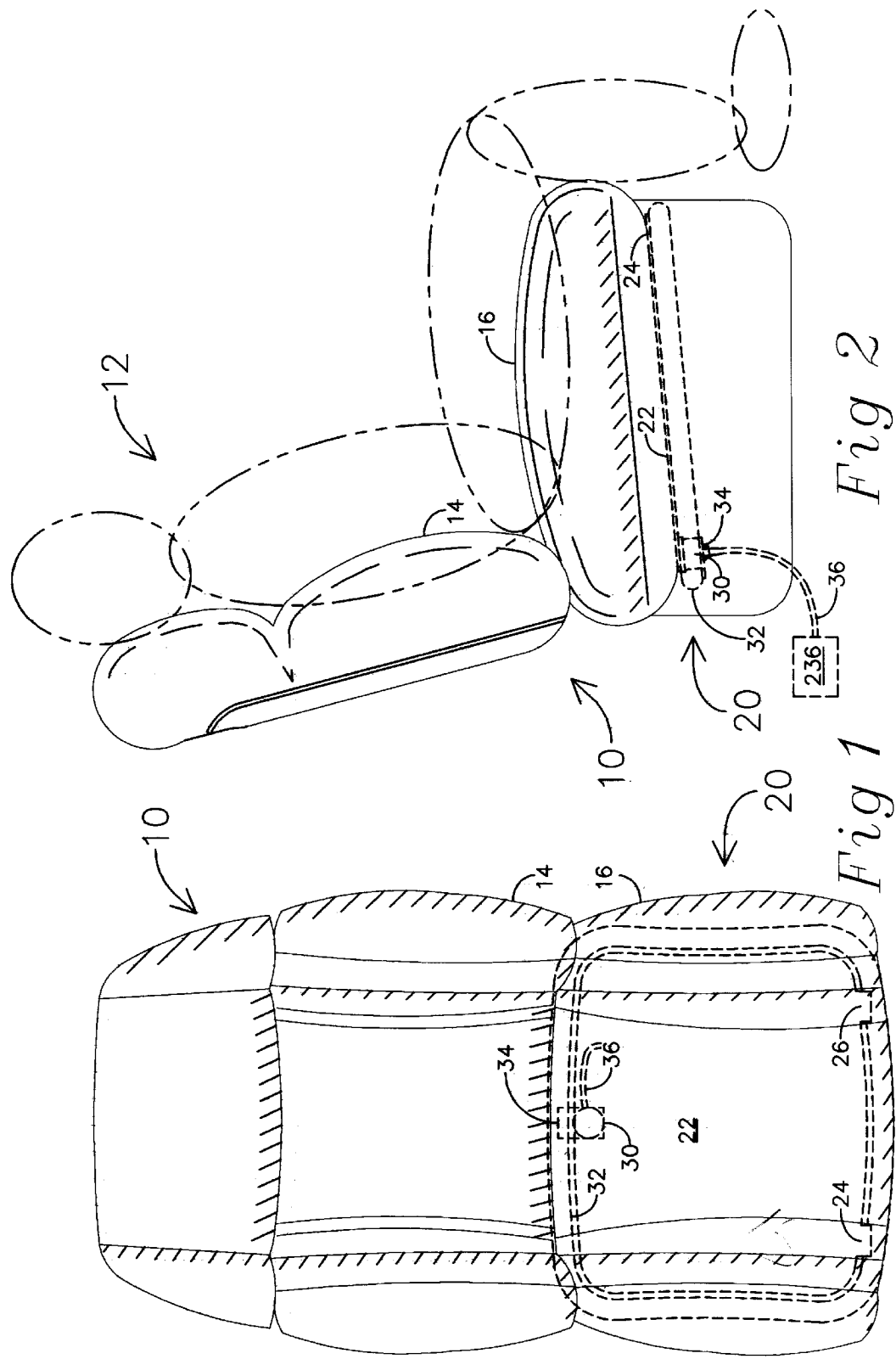

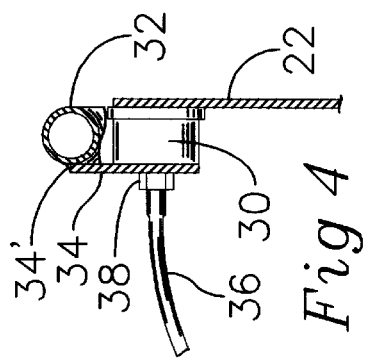
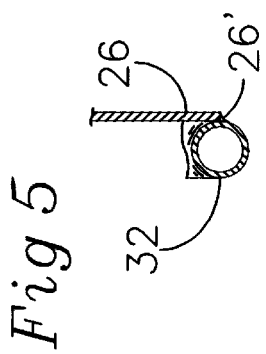
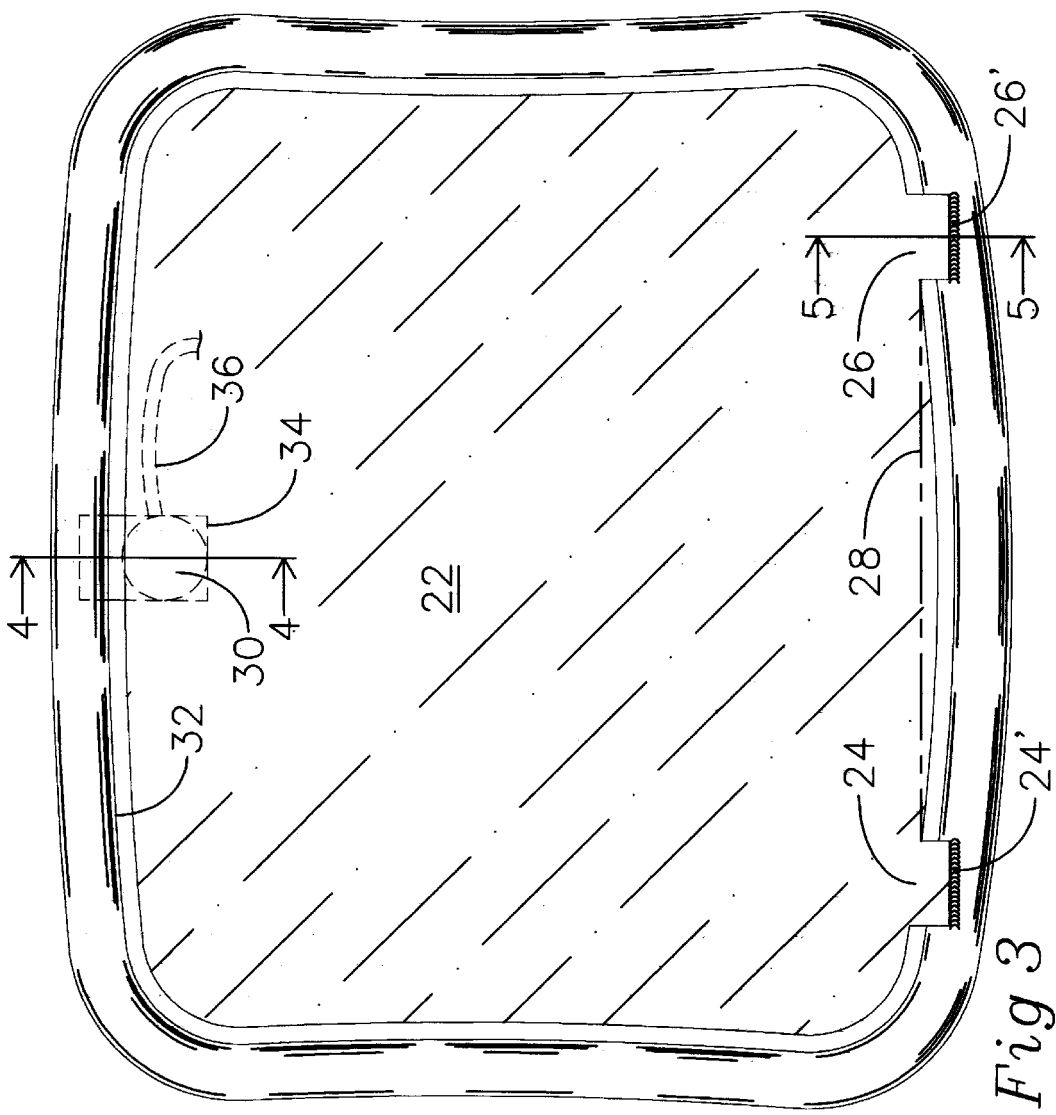

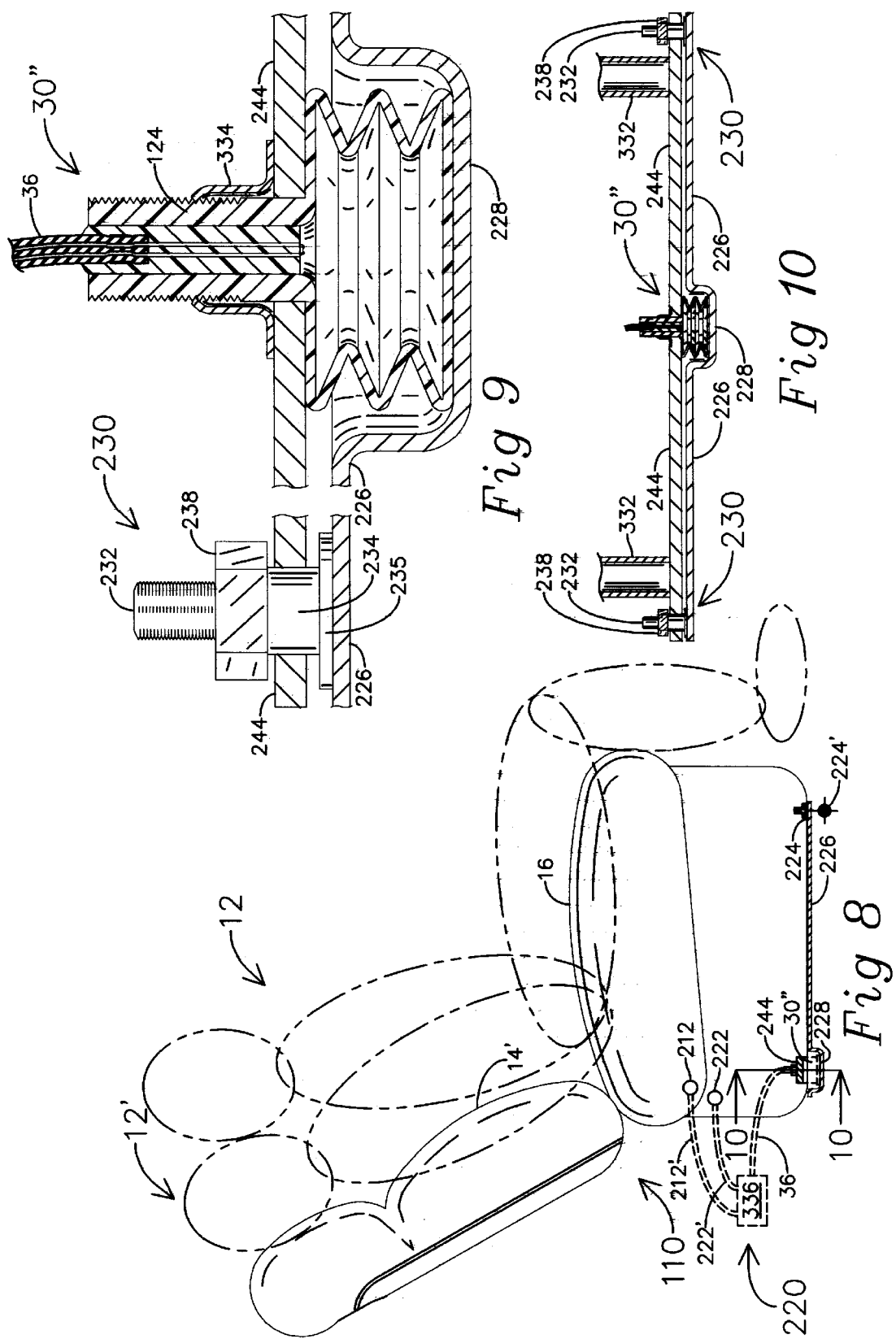

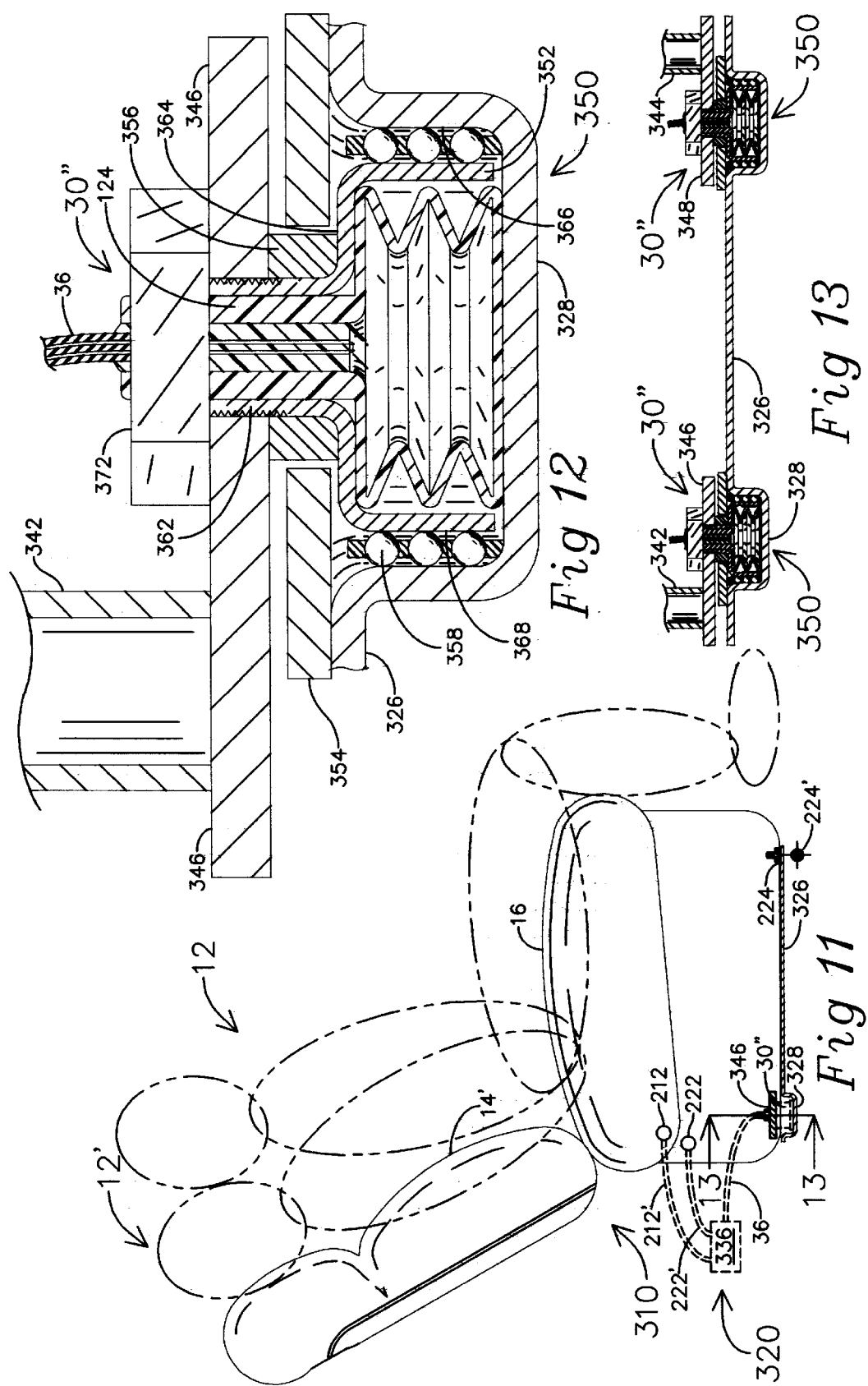

SEAT OCCUPANT WEIGHT SENSING SYSTEM

FIELD OF THE INVENTION

This invention relates to apparatus for ascertaining what is occupying a vehicle seat for the purpose of deciding if and how air bags should be deployed.

BACKGROUND OF THE INVENTION

Air bags of occupant protection systems are expensive and in certain circumstances are dangerous. It is therefore desirable to prevent deployment when the seat is empty to save the cost of replacement. It is important to prevent deployment when the seat is occupied by a child or by a very small adult if the occupant might be injured by deployment.

Occupant protection systems typically include a "sensor and diagnostic module" or "SDM" which performs various functions related to sensing the occurrence of a vehicle crash, monitoring various elements of the occupant protection system for proper operation and initiating deployment of occupant protection devices. SDM's typically include a microprocessor, an accelerometer responsive to decelerations parallel with the vehicle axis, an arming sensor, circuitry combining the aforementioned components to function together and switches for initiating deployment of the occupant protection devices.

Many systems are known that sense properties of the occupant of a seat. Certain of these systems contain elements for weighing the occupant. If the weight is very small it may be assumed that the seat is unoccupied or occupied by a small child, and in either case deployment would not be desired. If the weight is intermediate, say between 25 and 40 kilograms, then the occupant is likely to be a child and whether or not an airbag should be deployed depends on factors such as how energetically the airbag deploys. If the weight is greater than 45 kilograms the seat occupant is likely to be an adult who would be protected by an airbag.

Three types of weight sensing systems for installation in vehicle seats are known: A first type of weight sensing system comprises an array of force sensors located immediately beneath the upholstery material of the seat cushion which operates to measure the pressure of the occupant against the seat at the points where sensors are located. These sensors are typically responsive to small forces applied over a small area and an array of force sensors tells a microprocessor the magnitude and distribution of the force the occupant applies to the cushion. The microprocessor ascertains the weight and other characteristics of the seat occupant from the information provided by the array of force sensors.

A second type of weight sensing system is useful in the type of seat having a fabric covered seat cushion of foam rubber-like material supported by a platform. The second type of weight sensing system includes, typically, four force sensors located at the four corners of the platform between the platform and the frame of the seat. The outputs of the four sensors are added to ascertain the total weight being supported by the platform and, therefore, by the seat cushion.

A third type of weight sensing system comprises sensors for sensing stress in structural members of the seat. For example, a chair with a force sensor sensing the weight carried by each leg. The outputs of the four (in the case of the example) sensors are added to ascertain the total weight of the occupant.

All known embodiments of the aforementioned weight sensing systems fail to perform as desired in certain situations and no design is widely accepted at this time. In vehicles where the seat belts are attached to the structure of the vehicle all known weight sensing systems present the concern that a tightly belted child seat may impose stresses that make it appear to be an adult to the weight sensing system. All known designs must take into account that the feet of most normally seated adults will be resting on the floor so that some of the weight will not be seen by a weight sensing system, whereas a child or very small adult will apply all weight to the seat.

Force sensors placed immediately beneath the seat upholstery complicate manufacture and may affect the feel of the seat as sensed by the occupant.

It is well known to sense a force by applying it to a piston to generate hydraulic pressure sensed by a pressure sensor calibrated in units of force.

Seat occupant weight sensing systems responsive to stress in the seat structure must respond only to forces related to the weight of the seat occupant and not to stresses resulting from thermal expansion or attachment to the vehicle. This is not always easily achieved. However, seat structure force sensors are known to advantageously solve the aforementioned problem of belt forces causing a child seat to appear to be an adult: By anchoring the seat belts to the seat and placing the force sensors below the belt anchors the belt forces are not included in the weight.

The type of sensor wherein the weight of an occupant sitting on a cushion is transmitted though the cushion and sensed at the platform supporting the cushion may fail to register an accurate weight because a fraction of the occupant's weight may be supported by the back of the seat rather than on the seat cushion and, therefore, not be sensed. Also, the fraction of the occupant's weight supported by the seat back varies with the angle to which the back is reclined.

Seat backs that can recline typically expose a larger area of cushion at greater seat back recline angles. This causes the weight of the head and body of an occupant to be applied farther toward the rear of the seat cushion when the seat back is reclined.

Semiconductor pressure sensors are manufactured in large quantities by micromachining silicon wafers. Designs are based on various technologies and physical principles. Many of these sensors require additional circuitry to achieve a useful function. Typically, an integrated circuit complements the micromachined pressure sensing element. Certain of these sensors are suitable for operation submersed in liquid and operate by sensing the pressure in the liquid.

Accelerometers responsive to accelerations between plus and minus one or two times the acceleration of gravity are readily available from several suppliers. One supplier is Entran Devices, Inc. of Fairfield, N.J.

Seats in commercial production include sensors indicating the position of the seat on its track and the amount that the back of the seat is reclined.

Injection blow molding is a highly developed technology for making beverage containers. By this process a hollow piece of injection molded plastic is heated and placed in a form after which pressurized gas is blown into the hollow of the molded plastic. The pressure expands the heated plastic until its expansion is limited by a form. After cooling the completed product is removed from the form.

It is well known to connect a sensor using only two electrical conductors. The conductors simultaneously supply power and carry pulses of current over and above the current required to power the sensor. The width or magnitude of the pulses of current are modulated to indicate the physical quantity being sensed.

By the rules of Physics torque is always specified with respect to an axis. A torque about an axis may be caused by a force (considered to be a vector quantity) applied to a point that is not on the axis. The torque (also a vector quantity) is defined to be the vector product of the force vector times a distance vector from the point where the force is applied along a perpendicular to the axis. Hereinafter, only the scaler magnitude of the torque vector is discussed and it is called "torque". Hereinafter, "torque" resulting from a force applied at a point is defined to be the product of the magnitude of the component of the force vector in the direction perpendicular to both the axis and a perpendicular line from the point where the force is applied to the axis times the distance along the perpendicular from the point where the force is applied to the axis.

A general object of this invention is to provide a seat occupant sensing system offering low cost and superior performance and also to provide a force sensor that is particularly adapted for sensing force derived from the weight of a seat occupant which also overcomes certain disadvantages of the prior art.

SUMMARY OF THE INVENTION

In accordance with a first embodiment of the invention, a seat occupant weight sensing system comprises a platform hinged near the front of the seat and supported by a force sensor near the rearward extension of the platform. The force sensor is, therefore, responsive to torque applied to the platform by a seat occupant.

Further, in accordance with the invention, the hinge extends horizontally and transversely to the vehicle axis whereby the axis of rotation of the platform is near the front of the seat.

Further, in accordance with the first embodiment of the invention, a seat back recline indicator provides information that enables calculating the occupant weight from the torque and recline angle thereby correcting for weight supported by the seat back. In certain cases of large recline angle the recline angle may dictate that the occupant is located where it would not be useful to deploy an airbag.

Further, in accordance with the first embodiment of the invention, the more rearward position of an occupant when the seat back is somewhat reclined partially or approximately compensates for the downward force the occupant applies to the seat back when the seat back is reclined.

Further, in accordance with a second embodiment of the invention, torque applied to the frame of the seat is measured. In the second embodiment a seat back recline sensor and a seat track position sensor provide information that enables calculating the occupant weight from the observed torque thereby enabling determination of occupant weight with only one force sensor. This is advantageous because many seats incorporate a track position sensor and a seat back recline sensor for other purposes. In certain cases the combination of the seat back recline angle and the seat track position may be useful to indicate that the seat occupant is not located where it would be useful to deploy an airbag.

Further, in accordance with the invention, the force sensor comprises a means for converting force to hydraulic pressure and a pressure sensor providing an electric signal indicating the hydraulic pressure.

Further, in accordance with the invention, a force sensor comprises a hollow neck sealingly accommodating a cylindrical plastic element having insert molded conductors and a pressure sensor adhesively mounted on an end.

Further, in accordance with the invention, the aforementioned force sensor also comprises a piston having a rounded protrusion and further comprises a cover having a protrusion mating with said protrusion and a retaining lip whereby the number of parts and the cost are minimized.

Further, in accordance with the invention, a second embodiment of the aforementioned force sensor comprises a blow molded bottle with bellows shaped walls and a neck sealed to the cylindrical plastic element having insert molded condoctors and a pressure sensor adhesively mounted on an end.

Further, in accordance with the second embodiment of the invention, a force sensor comprising fluid pressurized in proportion to applied force and a fluid pressure sensor having a neck with electrical conductors sealing brought therethrough is located in a well and receives force through an element having two diameters with the smaller diameter part providing attachment to a seat frame and the larger diameter part providing low friction bearings and resistance to upward force.

Further, in accordance with the invention, two or more force sensors are connected with a microprocessor which adds the two forces to calculate the total force.

Further, in accordance with the invention, changes of the readings of the force sensor are compared with changes of vertical accelerations measured by an accelerometer for ascertaining if the seat contains a child seat.

A complete understanding of this invention may be obtained from the description that follows taken with the accompanying drawings.

DESCRIPTION OF THE DRAWINGS

FIG. 1 shows a front view of a complete vehicle seat with the occupant weight sensing system of the invention illustrated by hidden lines.

FIG. 2 shows a side view of the vehicle seat illustrated in FIG. 1 with the occupant weight sensing system of the invention again illustrated by hidden lines and with an occupant indicated by 5 ellipses in phantom lines.

FIG. 3 shows the platform of the occupant weight sensing system of the first embodiment of the invention with part of the frame of the seat and with the force sensor and the shelf supporting it indicated by hidden lines.

FIG. 4 shows the force sensor with part of the platform of the occupant weight sensing system of the invention partially in section taken at section 4—4 of FIG. 3.

FIG. 5 shows a hinge of the occupant weight sensing system of the invention with part of the frame of the seat partially in section taken at section 5—5 of FIG. 3.

FIG. 8 shows a side view of the seat and occupant as illustrated in FIG. 6 but incorporating the second embodiment of the occupant weight sensing system of the invention partly in section taken at the center of the seat.

FIG. 9 shows partially in section enlargements of the rear seat anchor and the force sensor of the second embodiment of the occupant weight sensing system of the invention.

FIG. 10 shows partially in section part of the seat structure and the force sensor of the second embodiment of the occupant weight sensing system of the invention taken at section line 10—10 of FIG. 8.

FIG. 11 shows a side view of the seat and occupant as illustrated in FIG. 8 but with two force sensors and including low friction bearings.

FIG. 12 shows partially in section an enlargement of part of the seat structure and the force sensor of the invention illustrated in FIG. 11.

FIG. 13 shows partially in section part of the seat structure and two force sensors with low friction bearings of the second embodiment of the occupant weight sensing system of the invention taken at section line 13—13 of FIG. 11.

BEST MODE FOR CARRYING OUT THE INVENTION

Figure 7:
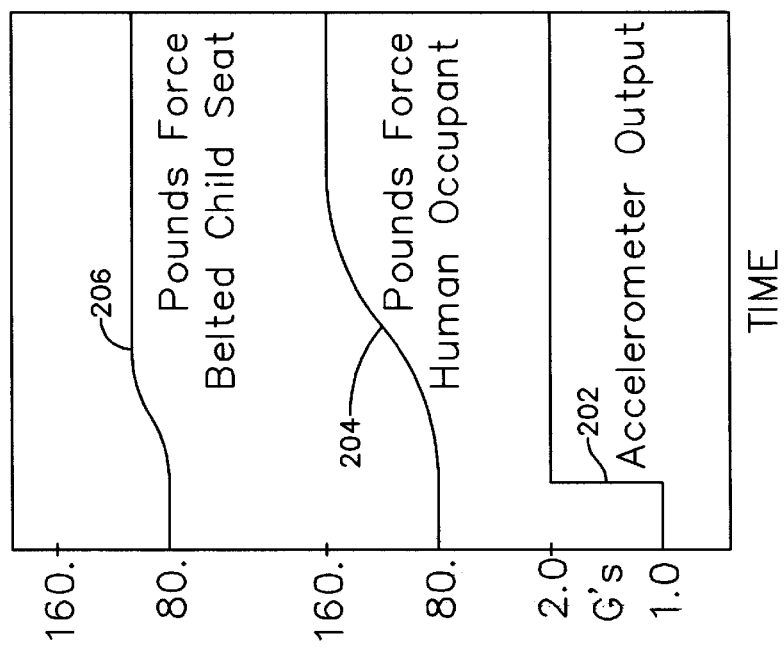
FIG. 7 shows the different outputs of the force sensor with a normal human occupant and with a belted child for distinguishing between a seat containing an adult human and a seat containing a tightly belted child seat.

Proceeding first with reference to FIGS. 1 and 2, a vehicle seat 10 is occupied by an occupant 12 and is equipped with an occupant weight sensing system 20 for ascertaining the weight of the occupant. The occupant 12 is suggested by five ellipses defined by phantom lines. The occupant weight sensing system 20 is shown with hidden lines. The occupant weight sensing system 20 comprises a rigid platform 22 that receives force from the occupant through cushion 16 and a force sensor 30 responsive to downward force between the rearward edge of platform 22 and a shelf 34 rigidly attached to the frame 32 of the seat. The occupant weight sensing system 20 also comprises processing unit 236 which includes a microprocessor and may include an accelerometer responsive to vertical acceleration. Processing unit 236 is preferably combined with an SDM into one package and, preferably, sharing one microprocessor. If processing unit 236 and the SDM are not unitary then there is an electrical connection between processing unit 236 and the SDM for communicating information therebetween. By virtue of platform 22 being hinged at one edge and force being measured at the opposite edge the occupant weight sensing system 20 is responsive to torque applied to platform 22 about hinges 24 and 26. By virtue of being a torque sensor the occupant weight sensing system 20 is particularly responsive to the weight of the head and torso of the occupant and is relatively unresponsive to the fraction of the weight of the lower thighs, lower legs and feet that is not applied to the vehicle floor. It will be appreciated as the description proceeds that the invention may be implemented in different embodiments.

Continuing now the description of occupant weight sensing system 20 with particular reference to FIGS. 1 through 5, occupant weight sensing system 20 comprises platform 22 for supporting cushion 16. Platform 22 is preferably made of sheet steel in the manner of conventional seat cushion supporting platforms and may be rigid by virtue of its thickness as illustrated or may have ribs or other shapes (not illustrated) stamped into it to achieve rigidity with less material and lower weight. Hinges 24 and 26 are preferably unitary with platform 22 and function as hinges by flexing. Hinges 24 and 26 are attached by welds 24' and 26' to structural frame member 32 of the seat 10. Other materials and manufacturing methods suitable for platform 22 and hinges 24 and 26 may be substituted by those skilled in the relevant arts.

Force sensor 30 provides an electrical signal through electrical conductors 36 to processing unit 236 that indicates the axial compressive force applied to force sensor 30. Force sensor 30 is attached by threaded nut 38 to shelf 34. Shelf 34 is preferably a piece of sheet steel attached by weld 34' to structural frame member 32 of the seat. Preferred force sensors comprise means for pressurizing hydraulic fluid in proportion to applied force and a pressure sensor for providing an electrical signal responsive to pressure. Force sensor 30 indicates force applied by platform 22 at a known distance from hinges 24 and 26 and, therefore, the torque about hinges 24 and 26 applied by cushion 16 to platform 22. Two force sensor designs are described hereinafter with reference to FIGS. 14 and 15.

The materials referred to hereinabove are only suggestions and other materials may be selected by those skilled in the relevant arts.

The operation of the seat occupant weight sensing system 20 of the invention will now be described with reference to FIGS. 1 through 5. In operation of the system, when seated occupant 12 applies force to seat cushion 16 the force is transmitted by cushion 16 to platform 22. The weight of the head, torso and upper thighs of occupant 12 is applied through seat cushion 16 closer to the rear edge of platform 22 than to the front edge therefore applying a substantial torque to platform 22 about the axis of hinges 24 and 26. Simultaneously, some fraction (which might be zero) of the weight of the lower thighs, lower legs and feet of occupant 12 is applied through seat cushion 16 closer to the forward edge of platform 22 than to the rear edge thereby adding little or no torque to the aforementioned torque resulting from application of the weight of the head, torso and upper thighs. The torque contributed by the lower thighs, lower legs and feet is small regardless of the actual weight because the torque is the product of weight and distance from the axis of the hinges 24 and 26 and the distance is small. The torque resulting from the weight of the lower thighs, lower legs and feet is even smaller when some of that weight is transmitted through the lower legs and feet to the floor of the vehicle and is zero when all of that weight is transferred to the floor of the vehicle.

Therefore, the torque applied to platform 22 is substantially caused by application of the weight of the head, torso and upper thighs of seat occupant 12 through cushion 16 to platform 22. The torque causes platform 22 to rotate very slightly about hinges 24 and 26 and apply force to force sensor 30. Force sensor 30 responds by transmitting a signal to processing unit 236 indicating the magnitude of the force being applied to force sensor 30. Processing unit 236 combines the information from force sensor 30 with other information such as vertical acceleration to determine the weight of the seat occupant.

Figure 6:
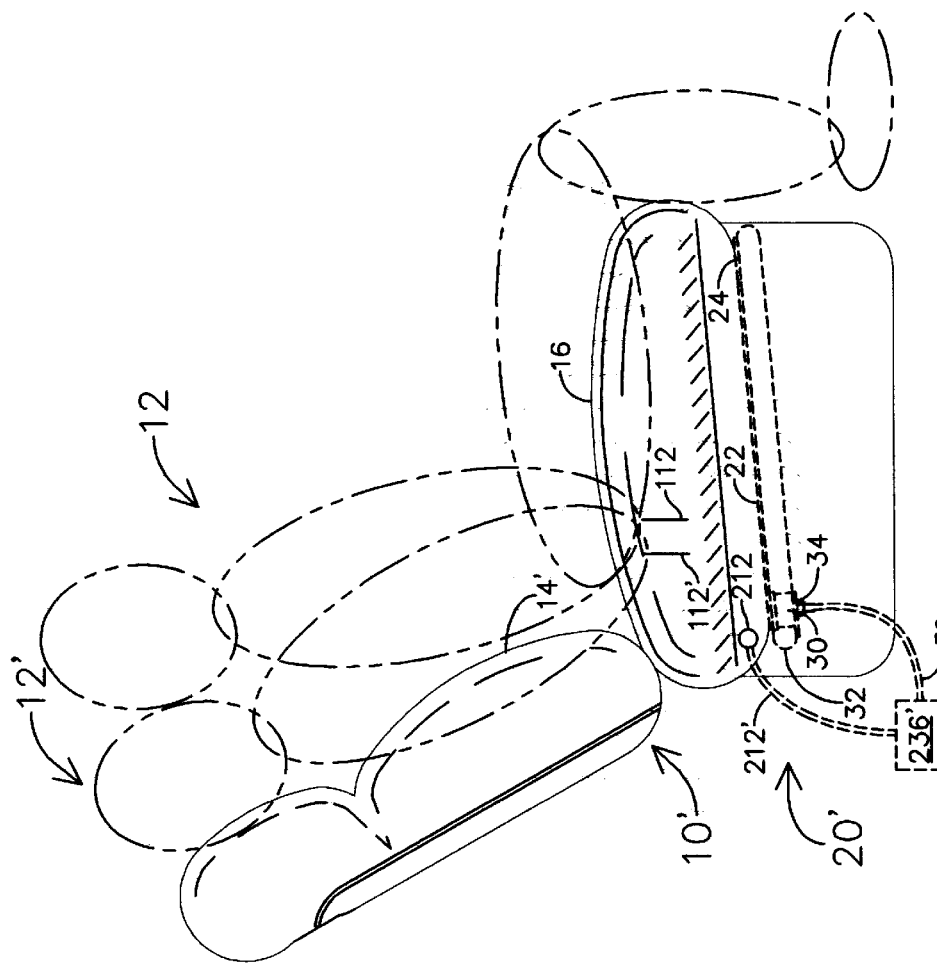
FIG. 6 shows a side view of the seat illustrated in FIG. 2 with the seat back reclined fifteen degrees more than in FIG. 2 and with the occupant indicated in both an unreclined position and reclined fifteen degrees.

Proceeding now to with particular reference to FIG. 6, seat occupant weight sensing system 20' comprises processing unit 236' connected for receiving information from force sensor 30 and seat back recline sensor 212. Seat 10' is different from seat 10 by the addition of angular position sensor 212 that indicates the recline angle of back 14' of seat 10'. Processing unit 236' is connected through cable 36 for receiving information from force sensor 30 and through cable 212' for receiving information from seat back recline sensor 212. Processing unit 236' includes a microprocessor and may include an accelerometer responsive to vertical acceleration. Back 14' of seat 10' is reclined fifteen degrees more than back 14 of seat 10 illustrated in FIG. 2. When reclining, seat back 14' rotates about seat back recline sensor 212. Occupant 12 is illustrated in the occupant position illustrated in FIG. 2 and occupant 12' is illustrated in the sitting position appropriate for when the seat back 14' is reclined the additional fifteen degrees illustrated in FIG. 6. Lines 112 and 112' mark respectively the horizontal positions of the points where the weights of the torsos of occupants 12 and 12' are applied to seat cushion 16 and thereby indicate the respective distances from the rotation axis of hinges 24 and 26.

When the seat back 14' is reclined as illustrated in FIG. 6 the weight of occupant 12' is applied through seat cushion 16 at distance 112' from the axis of rotation of hinges 24 and 26. When the seat back 14 is reclined as illustrated in FIG. 2 the weight of occupant 12 is applied through seat cushion 16 at distance 112 from the axis of rotation of hinges 24 and 26. Distance 112' is typically greater than distance 112 for seats that are currently being manufactured. Therefore, a weight applied at distance 112' will cause a greater torque as sensed by force sensor 30 about hinges 24 and 26 than an equal weight will cause if applied at distance 112.

In the reclined seat back position illustrated in FIG. 6 some of the weight of the occupant 12' might be supported by the back 14' of seat 10' whereas in the position illustrated in FIG. 2 little or none of the weight of the occupant 12 would be supported by the back 14 of seat 10. In the reclined seat back position illustrated in FIG. 6 the torque applied by occupant 12' through seat cushion 16 to platform 22 and sensed by force sensor 30 results principally from the weight of the head and torso of occupant 12' reduced by any weight supported by the back 14' of seat 10' multiplied by the distance 112'. In the seat upright position illustrated in FIG. 2 the torque applied by occupant 12 through seat cushion 16 to platform 22 and sensed by force sensor 30 results principally from the weight of the head and torso of occupant 12 multiplied by the distance 112.

Torque measurement is advantageous relative to seat occupant weight measurement. Firstly, torque measurement is inherently insensitive to the weight of the lower thighs and lower legs. This is advantageous because the weights of these parts are often supported at the floor and it cannot be known to what degree weights from the front part of the seat are meaningful. Torque measurement is also advantageous in the case of a rear facing child seat because the child weight is concentrated forward on the seat thereby applying very little torque if it is not tightly belted down. A weight sensing system that indicates low torque in the case of a rear facing child seat is advantageous because a low value is indicative of an empty seat and deployment is not desired in either the case of a rear facing child seat or an empty seat.

It is now also apparent that torque measurement is also advantageous because it inherently compensates to some degree for the greater weight supported by reclined seat back 14' relative to the weight supported by seat back 14 which is not reclined because of the greater distance 112' at which occupant weight is applied when the seat back 14' is reclined. Therefore, force sensor 30 tends to indicate a more constant torque for a given occupant as the seat back 14' is reclined, at least for modest seat back recline angles. Further, with this new understanding, seat designers are now motivated to locate the rotation axis of the seat back lower and farther forward in the seat structure than in currently manufactured designs to enable a seat occupant weight sensing system responsive to torque to accurately indicate seat occupant weight over a wider range of seat back recline angles than is possible with present seat designs.

The materials referred to hereinabove are only suggestions and other materials may be selected by those skilled in the relevant arts.

The operation of the seat occupant weight sensing system 20' of the invention will now be described with particular reference to FIG. 6.

In preparation for operation of the occupant weight sensing system 20' a table is prepared by performing a number of tests with occupant weight sensing system 20'. In each test an adult or a child of known weight sits in seat 10' and the output of force sensor 30 is recorded for a set of seat back recline angles that cover the range of recline angles of seat back 14'. This is done for enough people of different weights and sizes to establish the relationship between the weight of the person in the seat and the outputs of sensors 30 and 212. A table is then prepared and stored in processing unit 236' from which it determines the weight of the occupant from the outputs of sensors 30 and 212.

The following examples fully explain the process for asserting an occupant's weight on the basis of angle and force readings: at first, second and third seat back recline angles with a 60 pound child not in a child seat force readings of 42 pounds, 39 pounds and 27 pounds are taken while with a 120 pound adult force readings of 74 pounds, 65 and 49 pounds are taken. With that information in its microprocessor, processing unit 236' receives a reading from seat back recline sensor 212 that seat back 14' is at the third seat back recline angle and receives a force reading from force sensor 30 of 50 pounds (about two percent more than 49 pounds). Processing unit 236' asserts that the seat occupant weighs about 122 (about two percent more than 120) pounds.

In a large data base there will be ambiguity. For example and continuing to utilize the aforementioned data; with a second 120 pound occupant force readings of 73, 62 and 43 pounds are taken. This might happen if the second 120 pound occupant had more weight concentrated in the chest. With the additional date in its computer, processing unit 236' receives a reading from seat back recline sensor 212 that seat back 14' is at the third recline angle and receives a force reading from force sensor 30 of 50 pounds (about two percent more than 49 pounds and about 15 percent more than 43 pounds). Processing unit 236' could then assert that the occupant weighs about 122 pounds based upon the first group of aforementioned data as explained hereinabove or that the occupant weighs about 138 pounds (fifteen percent more than 120 pounds) based on the last set of data. In such cases an average is a preferred response and processing unit 236' would assert that the seat occupant weighs 130 pounds (the average of 122 and 138 pounds). For purposes related to air bag deployment this is more than sufficient accuracy. In practice, the average values would be entered into the microprocessor of processing unit 236'.

It may happen that for certain seats and large seat back recline angles processing unit 236' cannot confidently assert the weight of the seat occupant. In that case the microprocessor of processing unit 236' registers that it cannot ascertain the weight of the occupant of seat 10'. This is believed to be acceptable because instances of occupants of seats having very reclined backs are believed to require different handling by the SDM. More particularly, the cases of greatest concern are children in infant seats and small people situated close to the stored airbag. Neither of these cases is likely to be associated with a greatly reclined seat back.

Proceeding now with particular reference to FIG. 7, the following explains the ability of occupant weight sensing systems 20, 20', 220 and 320 to distinguish between an adult seat occupant and a child seat being held in place by seat belts under such tension that force sensor 30 or 30" reads the same force for both the adult and the child seat. The output of force sensor 30 or 30" is illustrated for two seat occupant conditions while the seat encounters a change of vertical acceleration from zero to one times the acceleration of gravity. The change of the vertical acceleration is illustrated by trace 202. The change of force sensed by sensor 30 or 30" when the seat is occupied by an adult human of a certain weight is illustrated by trace 204. The change of force sensed by sensor 30 or 30" when the seat is occupied by a child of a certain weight in a child seat tightly restrained by seat belts is illustrated by trace 206. The change of force sensed by force sensor 30 or 30" is much less in the case of the tightly restrained child seat than in the case of the adult human because the force caused by the adult human during vertical accelerations varies in proportion to the acceleration while the force sensed by force sensor 30 or 30" in the case of a tightly restrained child is largely caused by elasticity of the seat cushion and by how tightly the belts are installed and is less affected by vertical acceleration.

It can be seen from FIG. 7 that when there is no vertical acceleration the output of force sensor 30 or 30" does not enable distinction between an adult human and a child in a child seat. However, if processing unit 236, 236' or 336 includes both a microprocessor and an accelerometer responsive to vertical accelerations, then, by remembering the force sensed by force sensor 30 or 30" at times when there is no vertical acceleration the microprocessor of processing unit 236, 236' or 336 can distinguish between an adult human and a child seat tightly held by seat belts by asserting the occupant is an adult human when the output of force sensor 30 or 30" varies approximately in proportion to the vertical acceleration as illustrated by trace 204 and asserting the occupant is a belted child seat when the output of force sensor 30 or 30" varies much less than in proportion to the vertical acceleration as illustrated by trace 206.

The operation of the seat occupant weight sensing systems 20, 20', 220 and 320 of the invention will now be described with particular reference to FIGS. 2, 6, 7, 8 and 11. When power is first turned on and the vehicle engine is started, processing unit 236, 236' or 336 receives a force reading from force sensor 30 or 30". If the force reading indicates a very small force then processing unit 236, 236' or 336 immediately registers that the seat is not occupied and that the occupant protection system for that seat should not be deployed. If the force reading indicates a larger force then processing unit 236, 236' or 336 tentatively registers a seat occupant weight based solely on the output of force sensor 30 or 30".

As the vehicle is driven, and assuming processing unit 236, 236' or 336 includes a vertical accelerometer, as soon as an upward vertical acceleration occurs processing unit 236, 236' or 336 compares the fractional change in vertical acceleration with the fractional change in the force sensed by force sensor 30 or 30". If the ratio of the change in vertical acceleration to the acceleration of gravity and the ratio of the change in the force sensed by force sensor 30 or 30" to the force sensed prior to the acceleration are approximately the same, for example, agreeing to within ±10% then the microprocessor of processing unit 236, 236' or 336 asserts that the seat occupant is a normally seated human and the weight is equal to the weight that was tentatively registered. If the ratio of the change in vertical acceleration to the acceleration of gravity is substantially greater than the ratio of the change in the force sensed by force sensor 30 or 30" to the force sensed prior to the acceleration, for example twice or more as great, then the microprocessor of processing unit 236, 236' or 336 asserts that the occupant is a belted child seat. If the ratio is intermediate, then the microprocessor of processing unit 236, 236' or 336 may delay making a decision until additional readings are taken to more definitely ascertain the nature of the seat occupant before asserting either that the weight is equal to the tentative value or asserting that the occupant is a child seat.

Proceeding now with particular reference to FIGS. 8 through 10, seat occupant weight sensing system 220 comprises processing unit 336 connected for receiving information from one or more force sensors 30", seat back recline sensor 212 and seat track position sensor 222. Processing unit 336 is connected through cable 36 for receiving information from force sensor 30", though cable 212' for receiving information from seat back recline sensor 212 and through cable 222' for receiving information from seat track position sensor 222. Processing unit 336 includes a microprocessor and may include an accelerometer responsive to vertical acceleration. Back 14' of seat 110 is reclined fifteen degrees more than back 14 of seat 10 illustrated in FIG. 2. When reclining, seat back 14' rotates about seat back recline sensor 212. Occupant 12 is illustrated in the position illustrated in FIG. 2 and occupant 12' is illustrated in a position appropriate for when the seat back 14' is reclined the additional fifteen degrees illustrated in FIG. 8. Seat 110 is different from seat 10 or 10' by incorporating seat occupant weight sensing system 220 in place of seat occupant weight sensing system 20 or 20'. In seats 10 and 10' occupant weight sensing systems 20 and 20' are cushion based systems responsive to torque applied to platform 22 through seat cushion 16. In seat 110 occupant weight sensing system 220 is responsive to torque applied to the entire seat. Seat occupant weight sensing system 220 also comprises one or more forward seat anchors 224 and one or more rear seat anchors 230.

Processing unit 336 is preferably combined with an SDM into one package and, preferably, shares the microprocessor. If processing unit 336 and the SDM are not unitary then there is an electrical connection between processing unit 336 and the SDM for transmitting information therebetween.

Seat 110 may be any automobile seat having a seat track position sensor 222 and, if its back reclines, a seat back recline sensor 212. Seat 110 may have a foam rubber filled cushion resting on a platform like seat 10 or its seat cushion may be of a different design and may not rest on a platform. Seat 110 is a conventional vehicle seat in all respects except that beam 244 has been added. Beam 244 is a rigid steel beam provided in place of or in addition to two rear flanges normally part of the seat for attachment to the vehicle. Beam 244 extends horizontally between two rear seat frame members 332 to which it is attached by welding (not illustrated) and has three holes drilled through itself: one for receiving neck 124 of force sensor 30" and two for mating to shoulders 234 and retention by nuts 238. Seat 110, being a conventional car seat except for the addition of horizontal beam 244, is designed for attachment to the vehicle at four fastening points. (Certain vehicle seats have only three fastening points.) The forward flanges of seat 110 are attached to the vehicle floor pan in a completely conventional manner by the same fasteners that would be used if the seat did not sense occupant weight.

Fasteners 224 attach seat 110 near its forward extension to the floor of the vehicle. Fasteners 224 comprise nuts screwed onto studs attached by such as welding to the vehicle floor pan or other known fastening means. This is a common method of seat attachment. Certain vehicle seats have other attachment arrangements which are well known to those skilled in the vehicle seat art and will not be elaborated upon herein. Forward seat anchors 224 operate as pivots that allow rotation of seat 110 about an axis 224' approximated by a line between seat anchors 224 by virtue of the flexibility of the vehicle floor and, additionally in certain designs some of which are presently in high volume production, that provide for rotation of the seat frame about the aforementioned axis. When installed in the conventional manner without weight sensing system 220 the aforementioned rotation about axis 224' does not occur because the seat is firmly attached to the vehicle at one or two points well to the rear of forward seat anchors 224.

Horizontal beam 244 is allowed limited vertical movement near to the floor of the vehicle by seat anchors 230. Each seat anchor 230 comprises a threaded stud 232 with a larger diameter shoulder 234, a head 235 and a nut 238 tightened against shoulder 234. A washer (not illustrated) may be included. Head 235 is attached by welding to vehicle floor pan 226. Horizontal beam 244 is attached by welding to tubular members 332 of the seat frame for receiving downward force from members 332 of the seat frame and transmitting that force to force sensor 30". (Please refer to FIG. 9 for an illustration showing the relationship between threaded stud 232, shoulder 234, head 235, nut 238, floor pan 226 and horizontal beam 244.) Seat anchors 230 allow limited vertical movement of horizontal beam 244 between heads 235 and nuts 238 while shoulders 234 prevent horizontal movement. The vertical movement of horizontal beam 244 is accompanied by rotation of seat 110 about axis 224'. The interface between horizontal beam 244 and shoulder 234 is illustrated as a simple hole in horizontal beam 244 slidingly movable on shoulder 234. To enhance durability any bearing system known to those skilled in the art of low friction bearings, for instance a linear recirculating ball bearing, may be substituted for the simple sliding bearing most clearly illustrated in FIG. 9.

Force sensor 30" is preferably the same as force sensor 30" illustrated in FIG. 15 and fully described hereinafter. Force sensor 30" provides an electrical signal through electrical conductors 36 to processing unit 336 indicating the axial force applied by beam 244 to force sensor 30". In the preferred design described hereinafter, force sensor 30" contains a fluid that is pressurized by the force applied by beam 244 and also contains a pressure sensor that provides an electrical output indicating the pressure in the fluid. Seat track position sensor 222 and seat back recline sensor 212 may be any of the known sensors conventionally on vehicle seats or known to be suitable by those skilled in the relevant arts for sensing track position and seat back recline respectively and having outputs suitable for input to processing unit 336.

Force sensor 30" resides in well 228 formed in the vehicle floor pan 226 and is attached by slip-on nut 334 to horizontal beam 244. Force sensor 30" senses force resulting from the weight of the seat and the weight of its occupants. Because force sensor 30" is located a fixed distance perpendicular to axis 224' the output of force sensor 30" is an indication of torque about axis 224' caused by the weight of seat 110 and the weight of the occupant in seat 110.

The back 14' of seat 110 is reclined fifteen degrees more than the back 14 of seat 10 illustrated in FIG. 2. The seat back 14' rotates about seat back recline sensor 212. Seat track position sensor 222 senses the forward-backward position of seat 110 on its track. Occupant 12 is illustrated in the occupant position illustrated in FIG. 2 and occupant 12' is illustrated in the sitting position appropriate for seat 110 with its seat back 14' reclined an additional fifteen degrees. The seat is adapted to move forward and backward on its track over a range of positions that is typically a range of about nine inches. Different positions of the seat on its track are not illustrated.

In the reclined seat back position illustrated in FIG. 8 the weight of the reclined head and torso of occupant 12' is concentrated at a more rearward location relative to where the weight of the head and torso of occupant 12 is concentrated. This causes the force sensed by force sensor 30" to be greater for a given seat occupant when the back 14' is more reclined than when the back 14' is less reclined. Similarly, the force sensed by force sensor 30" is greater for a given seat occupant when the seat 110 is in a more rearward position on its track than when the seat 110 is in a relatively less rearward position on its track.

The materials referred to hereinabove are only suggestions and other materials may be selected by those skilled in the relevant arts.

The operation of the seat occupant weight sensing system 220 of the invention will now be described with particular reference to FIGS. 8, 9 and 10.

In preparation for operation of the occupant weight sensing system 220 a table is prepared by performing a number of tests with occupant weight sensing system 220. In each test an adult or a child of known weight sits in seat 110 and the output of force sensor 30" is recorded for a set of seat track positions and seat back recline angles that cover the range of seat track positions of seat 110 and recline angles of seat back 14'. This is done for enough people of different weights and sizes to establish a relationship between the weight of the person in the seat and the outputs of sensors 30", 212 and 222. A table is then prepared and stored in the microprocessor of processing unit 336 from which it determines the weight of the occupant from the outputs of sensors 30", 212 and 222.

The following examples fully explain the process for asserting an occupant's weight on the basis of track position, angle and force readings: At a first track position and first, second and third seat back recline angles with a 60 pound child not in a child seat force readings of 42 pounds, 47 pounds and 57 pounds are taken, at a second track position force readings of 46 pounds, 52 pounds and 63 pounds are taken and at a third track position force readings of 50 pounds, 57 pounds and 69 pounds are taken. (Note that because of the leverage of the seat back, force readings greater than the weight of the seat occupant occur.) At a first track position and first, second and third seat back recline angles with a 120 pound adult force readings of 74 pounds, 84 and 98 pounds are taken, at a second track position force readings of 82 pounds, 94 pounds and 110 pounds are taken and at a third track position force readings of 94 pounds, 108 pounds and 126 pounds are taken.

With the information of the preceding paragraph in its computer when processing unit 336 receives a reading from seat track position sensor 222 that seat 110 is at its second track position, a reading from seat back recline sensor 212 that seat back 14' is at the third seat back recline angle and receives a force reading from force sensor 30" of 112 pounds (about two percent more than 110 pounds) then processing unit 336 can assert that the seat occupant weighs about 122 pounds (about two percent more than 120 pounds).

In a large data base there will be ambiguity. For example and continuing to utilize the aforementioned data; with a second 120 pound occupant force readings of 85, 102 and 122 pounds are taken at the second track position and first, second and third seat back recline angles. This might happen if the second 120 pound occupant has a longer torso and more weight concentrated in the chest. If processing 336 now receives a reading from seat track sensor position sensor 222 that seat 110 is at its second track position, a reading from seat back recline sensor 212 that seat back 14' is at the third seat back recline angle and receives a force reading from force sensor 30" of 112 pounds (about two percent more than 110 pounds and about nine percent less than 122 pounds) then processing unit 336 could assert that the occupant weighs about 122 pounds based upon the first group of aforementioned data as explained hereinabove or that the occupant weighs about 112 pounds (nine percent less than 122 pounds) based on the last of the aforementioned data. In such cases an average is a preferred response and processing unit 336 would assert that the seat occupant weighs 117 pounds (the average of 122 and 112 pounds). For purposes related to air bag deployment this is believed to be more than sufficient accuracy. In practice, the average values would be entered into the microprocessor of processing unit 336.

Proceeding now with particular reference to FIGS. 11 through 13, seat occupant weight sensing system 320 comprises processing unit 336 connected through two cables 36 for receiving information from two force sensors 30" each built into a force sensor assembly 350, through cable 212' for receiving information from seat back recline sensor 212 and through cable 222' for receiving information from seat track position sensor 222. Processing unit 336 includes a microprocessor and may include an accelerometer responsive to vertical acceleration. Seat 310 is a conventional vehicle seat in all respects and is the same as seat 110 illustrated in FIG. 8 except that beam 244 is not included and seat 310 includes two rear flanges 346 and 348 for attachment to the vehicle.

Processing unit 336 is preferably combined with an SDM into one package and, preferably, shares the microprocessor. If processing unit 336 and the SDM are not unitary then there is an electrical connection between processing unit 336 and the SDM for transmitting information therebetween.

Force sensor assemblies 350 each comprise a force sensor 30" in a well 328, a force applicator 352, a retaining washer 354, a spacing washer 356 and a ball bearing assembly 358. Force applicator 352 comprises threaded neck 362, shoulder 364 mating to spacing washer 356 and a larger diameter end having its outer diameter 368 mating with the bearing balls of ball bearing assembly 358. Nut 372 mates with threaded neck 362 for attaching seat flange 346 or 348 to a force sensor assembly 350. A washer (not illustrated) may be placed between seat flange 346 or 348 and nut 372. (Please refer to FIG. 12 for an illustration showing the relationship between force sensor 30", well 328, force applicator 352, retaining washer 354, spacing washer 356, ball bearing assembly 358, one of the seat flanges (346) and nut 372.

Wells 328 each comprise a wall 366 and a base mating with force sensor 30". Wells 328 may be formed in the floor pan 326 of the vehicle or may be made separately and welded to the floor pan 326. Wells 328 are formed by drawing from steel sheet. If rust resistance is desired then they are preferably formed from a stainless steel. Hardness is desirable because it reduces wear and rolling deformation at wall 366 during rolling contact with the bearing balls of bearing assembly 358.

Force applicator 352 receives force from spacing washer 356 at its shoulder 364 and applies that force to the shoulder surrounding the neck of force sensor 30". Force applicator 352 has threaded neck 362 which with spacing washer 356 enables attachment by nut 372 to a seat flange 346 or 348. Force applicator 352 is preferably formed by drawing from steel sheet on a progressive die machine. If rust resistance is desired then it is preferably formed from a stainless steel. Outer diameter 368 is prepared with a true and smooth finish to minimize the rolling resistance of the bearing balls of bearing assembly 358. Hardness is a desirable quality in outer diameter 368 to reduce wear and rolling deformation where rolling force is applied by the bearing balls of bearing assembly 358.

Retaining washer 354 is attached, preferably by welding, to the lip of well 328. Retaining washer 354 allows limited vertical movement of the seat flange 346 or 348 between the most downward position where the seat flange 346 or 348 engages the upper surface of retaining washer 354 and the most upward position where the shoulder 364 of force applicator 352 engages the lower surface of retaining washer 354.

The vertical movement of seat flanges 346 and 348 is accompanied by rotation of seat 310 about axis 224'.

Force sensor 30" is preferably the same as force sensor 30" illustrated in FIG. 15 and fully described hereinafter. Force sensor 30" provides an electrical signal through electrical conductors 36 to processing unit 336 indicating the axial force applied by force applicator 352 to force sensor 30". In the preferred design described hereinafter, force sensor 30" contains a fluid pressurized by the force applied by force applicator 352 and also contains a pressure sensor that senses pressure in the fluid. Seat track position sensor 222 and seat back recline sensor 212 may be any of the known sensors conventionally installed on vehicle seats or known to be suitable by those skilled in the relevant arts for sensing track position and seat back recline respectively and having outputs suitable for input to processing unit 336.

Force sensor 30" resides in well 328. Force sensor 30" senses force resulting from the weight of the seat and the weight of its occupants. Because force sensor 30" is located a fixed distance from axis 224' and responds to force that is perpendicular to axis 224' and is also perpendicular to a vector from axis 224' to force sensor 30", the output of force sensor 30" indicates the torque about axis 224' caused by the weight of seat 310 and the forces applied to seat 310.

Except for the differences described hereinabove seat 310 is the same as seat 110 and reference should be made to the description of seat 110 provided hereinabove with reference to FIGS. 8 through 10 to complete the description of seat 310.

The materials referred to hereinabove are only suggestions and other materials may be selected by those skilled in the relevant arts.

The operation of the seat occupant weight sensing system 320 will now be described with particular reference to FIGS. 11, 12 and 13.

When seat 310 moves relative to floor pan 326 outer diameters 368 of force applicators 352 engage the bearing balls of bearing assemblies 358 which in turn engage the inside diameters 366 of wells 328 for resisting lateral relative movement and allowing vertical relative movement.

When force from the weight of seat 310 and its occupant is applied to spacing washers 362, each spacing washer 362 transmits the force it receives to the flat shoulder at the neck of its force applicator 352 which transmits the force to its force sensor 30". Each force sensor 30" receives an equal and opposite force applied to its base by the base of its well 328. The fluid inside each force sensor 30" is confined by the bellows like structure of force sensors 30" but the height of force sensors 30" diminishes when force is applied. Consequently, the fluid inside each force sensor 30" is pressurized. A pressure sensor inside force sensor 30" produces a signal indicating the pressure in the fluid and transmits that signal through its cable 36 to processing unit 336. For a more detailed description of the operation of force sensor 30" the reader is referred to the complete description presented hereinafter with reference to FIG. 15. The microprocessor in processing unit 336 adds the two signals received from the two pressure sensors 30" thereby obtaining a value for the total torque being applied to seat 310 about axis 224'.

The operation of the seat occupant weight sensing system 320 is the same as the operation of seat occupant weight sensing system 220 except for the differences just described related to having two force sensors 30" with outputs being added and the force sensors being in assemblies providing low friction bearings. For further description of the operation of seat occupant weight sensing system 320 the reader is referred to the description of the operation of seat occupant weight sensing system 220 described hereinabove with reference to FIGS. 8 through 10.

Figure 14:
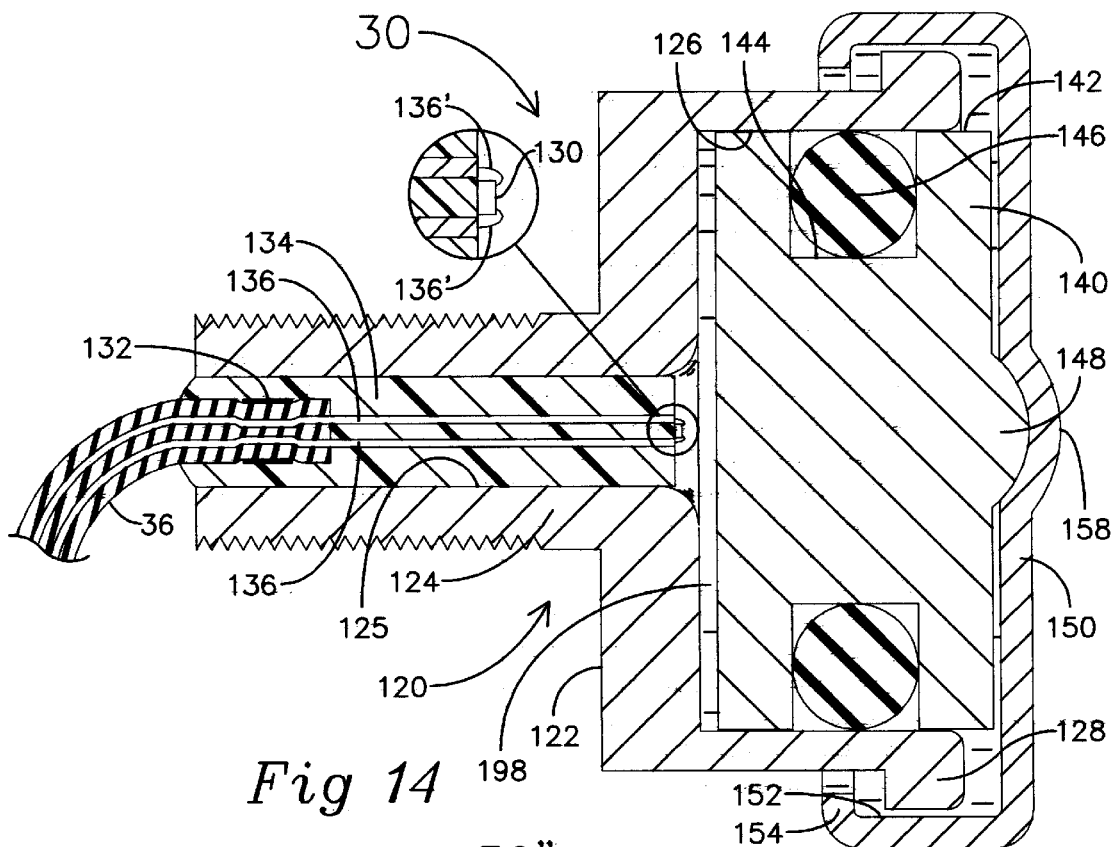
FIG. 14 shows a sensor for converting force to hydraulic pressure and then to an electric signal for measuring torque in the occupant weight sensing system of the invention.

Proceeding now with particular reference to FIG. 14, force sensor 30 of seat occupant weight sensing system 20 is shown in a particular embodiment comprising electrical cable 36, a cup element 120, an insulator 134 joined to electrical cable 36 at its outside end and to pressure sensor 130 at its inner end, a piston 140, an "O" ring 146 and a cover 150.

Cup element 120 is preferably made of steel to take advantage of its low cost and ease of machining. Other materials including aluminum and brass are suitable and offer the advantage of corrosion resistance. Cup element 120 comprises shoulder 122 and threaded neck 124 for mounting to such as shelf 34. The threads of neck 124 may be rings rather than spiral threads in which case mounting would be with a pressed on latching fastener. Cup element 120 also comprises central channel 125 which mates sealingly to the outside diameter of insulator 134. Cup element 120 also comprises wall 126 and outer flange 128. Wall 126 guides piston 140 and has a smooth surface against which "O" ring 146 seals to prevent loss of liquid 198. Outer flange 128 provides a latch for retaining outer shield 150.

Electrical insulator 134 is preferably molded of a thermoplastic molding compound with electrical conductors 136 inserted before molding. Electrical insulator 134 insulates electrical conductors 136 from electrical contact with each other and the surface of channel 125 of neck 124. Electrical insulator 134 also seals against leakage of liquid 198 from the interior of force sensor 30. Pressure sensor 130 is attached by a resilient adhesive (to minimize mechanical stress) to the interior end of electrical insulator 134. Cable 36 with clamping ring 132 is preferably molded into electrical insulator 134. Clamping ring 132 is a ring of steel or aluminum compressed or crimped around cable 36 for strong attachment thereto. The plastic of electrical insulator 134 engages clamping ring 132 thereby fixing cable 36 in electrical insulator 134 and resisting movement when force is applied to cable 36. During manufacture of electrical insulator 134, cable 36 with clamping ring 132 is placed in the mold with wires 136 extending across the cavity of the mold. Thermoplastic molding compound is injected around cable 36 with its extended wires 136 and clamping ring 132 to form insulator 134 and cable 36 as a unitary assembly. The plastic molding compound may be any molding compound known to provide a tight seal against leakage of liquid 198. One preferred molding compound for electrical insulator 134 is Ryton R9-02 available from Philips Engineered Plastics of Bartlesville, Okla.

Pressure sensor 130 is a solid state pressure sensor for sensing the pressure of liquid 198. Pressure sensor 130 is preferably a micromachined silicone pressure sensor. It may be a unitary piece of silicone with all required pressure sensing and compensation circuitry included or it may be a pair of pieces of silicone, one having the micromachined pressure sensor and the second having circuitry for interfacing between the micromachined pressure sensor and a circuit such as processing unit 236, 236' or 336. Pressure sensor 130 is mounted on electrical insulator 134 with a resilient adhesive to minimize strain that might affect the performance of pressure sensor 130. Pressure sensor 130 is electrically connected to the ends of electrical conductors 136 by fine aluminum or gold wires 136' between pads (not illustrated) on pressure sensor 130 and the ends of electrical conductors 136.

Electrical insulator 134 is installed in central channel 125 by a method that insures that liquid 198 will not flow past electrical insulator 134. A preferred method for sealing between insulator 134 and central channel 125 comprises the following steps: Electrical insulator 134 and central channel 125 are made with slight matching tapers to make insertion easier. Threaded neck 124 is heated in a high frequency induction heater or by blowing hot gas through channel 125 (or by another method known to be suitable by those skilled in the art of controlled heating) to a temperature above the melting temperature of the molding compound of which insulator 134 is made. Insulator 134 is inserted in central channel 125 of neck 124 and the parts are held stationary while the assembly cools. Initially, heated neck 124 melts the plastic at the surface of insulator 134 and simultaneously is cooled by insulator 134 to below the melting temperature of the plastic molding compound of which insulator 134 is made. As it cools, neck 124 contracts around insulator 134 while insulator 134 does not contract because it was only heated at its surface. After rehardening in conformance with the surface of channel 125 the molding compound at the interface between channel 125 and insulator 134 and the pressure from the contraction of neck 124 combine to make a tight seal.

Piston 140 is preferably made of the same material as cup element 120 and includes outer diameter 142 with groove 144 sized and polished to assure a good seal against "O" ring 146. The need for "O" ring 146 may be eliminated by providing such small clearance between piston 140 and surface 126 that fluid 198 does not leak through the clearance. Piston 140 also includes spherical protrusion 148 for receiving force resulting from the weight of the seat occupant.

Restraining cover 150 shields against dirt intrusion and prevents piston 140 from separating from cup element 120 when force transducer 30 is not installed in a vehicle. Restraining cover 150 comprises spherical protrusion 158 and extension 152 having inward turning flange 154. Restraining cover 150 is preferably formed from mild steel sheet. Restraining cover 150 is joined to the rest of force sensor 30 by applying force to cover 150 thereby causing flange 154 to snap over flange 128 of cup element 120 whereupon the two parts latch together. Spherical protrusion 158 mates with spherical protrusion 148 of piston 140. When force is applied to force sensor 30, spherical protrusion 158 transfers that force to protrusion 148 of piston 140.

Liquid 198 may be any of the liquids known to be compatible with the material of which cup element 120 and piston 140 are made and also with the plastic molding compound of which electrical insulator 134 is made and also with micromachined pressure sensor 130. Dow Corning of Midland, Mich. makes a variety of silicon based fluids of different viscosities which inherently meet the requirements for liquid 198 unless materials added to the silicon fluid stock for possible commercial purposes make the fluid incompatible with one or more of the components of force sensor 30.

The materials referred to hereinabove are only suggestions and other materials may be selected by those skilled in the relevant arts.

The operation of force sensor 30 of the invention will now be described with particular reference to FIG. 14. When force resulting from application of the weight of a seat occupant to a vehicle seat is applied to spherical protrusion 158 the force is directly transmitted to spherical protrusion 148 of piston 140. Simultaneously, equal and opposite force is applied to shoulder 122 surrounding threaded neck 124. The fluid 198 inside cup element 120 is confined by "O" ring seal 146. Consequently, the fluid 198 inside cup element 120 is pressured to a pressure equal to the applied force divided by the area defined by wall 126 of cup element 120. Pressure sensor 130 develops a signal indicating the pressure in fluid 198 and transmits that signal through conductors 136' and 136 to a processing unit such as processing unit 236 illustrated in FIG. 2.

Figure 15:
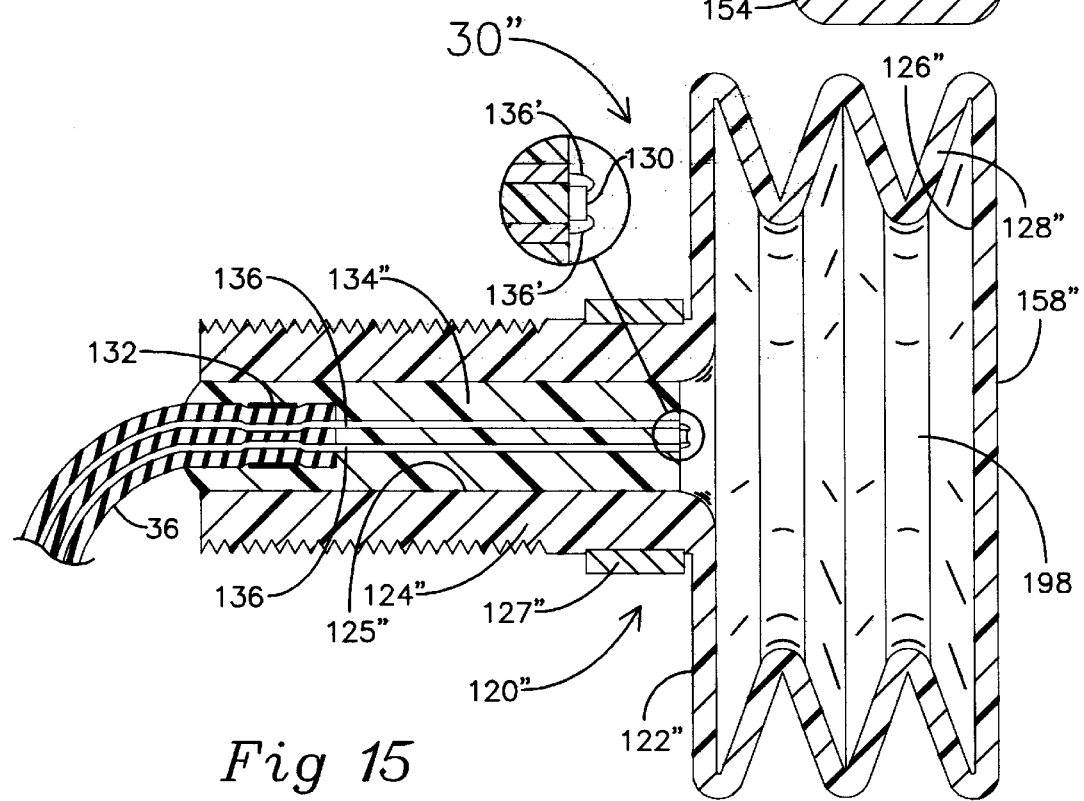
FIG. 15 shows an alternate sensor for converting force to hydraulic pressure and then to an electric signal for measuring torque in the occupant weight sensing system of the invention.

Proceeding now with particular reference to FIG. 15, force sensor 30" is shown in a particular embodiment comprising electrical cable 36, a blow molded bottle 120" with bellows shaped sides 128" and an electrical insulator 134" joined to electrical cable 36 at its outside end and to pressure sensor 130 at its inside end. Certain parts of force sensor 30" may be the same as the corresponding parts of force sensor 30 and are illustrated and numbered the same. Those parts that are different are numbered with numbers ending in double apostrophes. In particular, pressure sensor 130 and liquid 198 are preferably the same as described hereinabove with reference to FIG. 14 and electrical insulator 134" may be the same as electrical insulator 134 or may be molded of a different molding compound for compatibility with blow molded bottle 120".

Blow molded bottle 120" is preferably made of a plastic selected to achieve good blow molding properties with sufficient final strength, good durability over the life of the vehicle and good sealing to the plastic of which insulator 134" is made. Polyethylene terephthalate polyester in a formulation suitable for carbonated beverage bottles is believed to result in a superior bottle. Blow molded bottle 120" comprises shoulder 122" and threaded neck 124". The threads of neck 124" may be rings rather than spiral threads in which case attachment would be by a pressed on latching fastener. Blow molded bottle 120" also comprises central channel 125", clamping ring 127", bellows shaped sides 128" and flat surface 158". Central channel 125" mates sealingly to the outside diameter of insulator 134". Clamping ring 127" applies compressive force to insure a good seal during the life of the system. The bellows shape of sides 128" enables sides 128" to compress by flexing when force is applied to force sensor 30" between shoulder 122" and flat surface 158".

Clamping ring 127" is preferably a metal ring pressed onto a slightly tapered section of threaded neck 124" for an interference fit. Other methods for installing clamping ring 127" may be selected by those skilled in the relevant arts.

Electrical insulator 134" is preferably molded of thermoplastic molding compound with electrical conductors 136 inserted before molding. The molding compound is chosen for compatibility with the blow molding compound of which blow molded bottle 120" is made and for its ability to seal to conductors 134". One preferred molding compound for electrical insulator 134 is Ryton R9-02 available from Philips Engineered Plastics of Bartlesville, Okla. Except for possibly different molding compound electrical insulator 134" with cable 36 is the same as electrical insulator 134 described hereinabove with reference to FIG. 14.

Electrical insulator 134" is installed in central channel 125" of neck 124 by a method that insures that liquid 198 will not flow past electrical insulator 134". Many methods are known for joining thermoplastic parts to achieve a seal. These include applying a solvent to the joint, tapering and pressing together for an interference fit, acoustic welding and heating to achieve local melting. One known way to achieve local heating is to include material near the joint that can be heated by acoustic or microwave energy. It is believed that maintaining close tolerances and applying clamping ring 127" is sufficient.

The materials referred to hereinabove are only suggestions and other materials may be selected by those skilled in the relevant arts.

The operation of force sensor 30" of the invention will now be described with particular reference to FIG. 15. When force resulting from application of the weight of a seat occupant to a vehicle seat is applied to shoulder 122" at the neck of blow molded bottle 120" equal and opposite force is simultaneously applied to flat surface 158" at the base of blow molded bottle 120". The fluid 198 inside blow molded bottle 120" is confined by the bellows like structure of blow molded bottle 120" but the height of blow molded bottle 12" diminishes with little resistance when force is applied so the preponderance of the applied force is resisted by the pressure of fluid 198. Consequently, the fluid 198 inside blow molded bottle 120" is pressurized to a pressure approximately equal to the applied force divided by the area of flat surface 126" of the base of blow molded bottle 120". Pressure sensor 130" produces a signal indicating the pressure in fluid 198 and transmits that signal through conductors 136' and 136 to a processing unit such as processing unit 336 illustrated in FIG. 8.

Although the description of this invention has been given with reference to particular embodiments, it is not to be construed in a limiting sense. Many variations and modifications will now occur to those skilled in the art. For a definition of the invention reference is made to the appended claims.

What is claimed is:

1. A seat occupant sensing system for an occupant protection system of a vehicle of the type including processing means connected for deploying occupant protection means, said seat occupant sensing system comprising:

a vehicle seat, said seat comprising an element rotatable about an axis, said seat also comprising means responsive to force applied to said seat by applying torque about said axis to said rotatable element, said seat occupant sensing system also comprising torque sensing means connected for receiving torque about said axis from said rotatable element, and wherein:

said torque sensing means being responsive to said received torque by providing a torque signal indicating said received torque, there being an area on said seat such that said torque sensing means responds increasingly to vertical force applied to locations in said area as said locations are located increasingly toward the rear of the vehicle, and said processing means being connected with said torque sensing means for receiving said torque signal and considering said received torque when deploying said occupant protection means.

2. The invention as defined by claim 1 wherein:

said torque sensing means comprises force sensing means connected with said rotatable element at a predetermined distance from said axis for receiving force from said rotatable element, said force sensing means being responsive to force directed perpendicular to said axis and perpendicular to a vector in the direction of said distance, said force sensing means providing a force signal indicating said force from said rotatable element, said force signal thereby being said torque signal, and said processing means being connected with said force sensing means for receiving said torque signal and considering said torque signal when deploying said occupant protection means.

3. The invention as defined by claim 1 wherein:

said torque sensing means comprises force sensing means connected with said rotatable element at a predetermined distance from said axis for receiving force from said rotatable element, said force sensing means being responsive to force directed perpendicular to said axis and perpendicular to a vector in the direction of said distance, said force sensing means comprises fluid and means for converting said force from said rotatable element to pressure in said fluid and pressure sensing means for providing a pressure signal indicating said pressure, said pressure signal thereby being said torque signal, and said processing means being connected with said pressure sensing means for receiving said torque signal and considering said torque signal when deploying said occupant protection means.

4. The invention as defined by claim 3 wherein:

said means for converting said force to pressure in said fluid comprises a bottle having a neck, a shoulder, sides and a base; said sides joining said shoulder to said base, and said sides being sufficiently compressible that the preponderance of said force is resisted by pressure in said fluid when said force is applied between said shoulder and said base and not by said sides of said bottle.

5. The invention as defined by claim 4 wherein:

said sides are formed in a bellows shape.

6. The invention as defined by claim 3 wherein:

said means for converting said force to pressure in said fluid comprises a piston sealingly movable in a cup containing said fluid.

7. The invention as defined by claim 6 wherein:

said piston has a cylindrical shape with an interior end in contact with said fluid and an exterior end adapted for receipt of force, said exterior end comprises a first spherical protrusion for receipt of force, and including a protective cover comprising a second spherical protrusion for receipt of force and mating with said first spherical protrusion for transferring force thereto.

8. The invention as defined by claim 3 wherein:

said means for converting said force to pressure in said fluid comprises a neck comprising a hollow channel, and including an electrically insulating member including electrical conductors and mating with said channel, and sealing means for preventing said fluid from passing through said channel, and wherein said electrically insulating member having an end adapted for submersion in said fluid and having a pressure sensor mounted on said end, said pressure sensor being electrically connected with said electrical conductors.

9. The invention as defined by claim 8 wherein:

said sealing means comprises the product of a process comprising heating said neck and inserting said insulating member in said channel.

10. The invention as defined by claim 8 wherein:

said sealing means comprises an interference fit achieved by pressing said insulating member into said channel.

11. The invention as defined by claim 8 wherein:

said neck comprises a cylindrical outside surface, and said sealing means comprises a clamping ring located on said cylindrical outside surface applying inwardly directed force to said neck.

12. The invention as defined by claim 3, and including a base connected with said force sensing means for resisting movement of said force sensing means in a first direction, a force applying means connected with said rotatable element for receiving force therefrom and connected with said sensing means for applying force thereto in said first direction, and including low friction bearing means engaging both said base and said force applying means for providing unidirectional low friction movement therebetween.

13. The invention as defined by claim 12 wherein:

said low friction means comprises bearing balls.

14. The invention as defined by claim 12 and including:

a retaining washer for engaging said force applying means for limiting movement of said force applying means when said rotatable element applies force to said force applying means in a direction opposite said first direction.

15. The invention as defined by claim 1 wherein:

said seat comprises a seat back and a sensor responsive to the recline angle of said seat back by providing a seat back recline signal, and including calculation means responsive to said torque signal and to said seat back recline signal by estimating the weight of an occupant of said seat, and wherein said processing means being responsive to said weight estimate.

16. The invention as defined by claim 1 wherein:

said seat comprises a reclinable seat back and a sensor responsive to the recline angle of said seat back by providing a seat back recline signal, and said seat moves on a track and comprises a sensor responsive to the position of said seat on said track by providing a seat track position signal, and including calculation means responsive to said torque signal, said seat back recline signal and said seat track position signal by estimating the weight of an occupant of said seat, and wherein said processing means being responsive to said weight estimate.

17. The invention as defined by claim 1 including an accelerometer responsive to vertical acceleration by producing an acceleration signal indicating vertical acceleration during vehicle operation, and calculation means responsive to said torque signal and to said acceleration signal by distinguishing between a seat occupied solely by a human and a seat containing a tightly belted child seat.

18. The invention as defined by claim 17 wherein:

said calculation means computes a ratio of the fractional change of said torque signal to the fractional change of said acceleration signal when a vertical acceleration is encountered and asserts said seat contains a tightly belted child seat when said ratio is below a predetermined value.

19. The invention as defined by claim 1 wherein:

said seat moves on a track and comprises a sensor responsive to the position of said seat on said track by providing a seat track position signal, and including calculation means responsive to said torque signal and to said seat track position signal by estimating the weight of an occupant of said seat, and wherein said processing means being responsive to said weight estimate.

20. A seat occupant sensing system for an occupant protection system of a vehicle of the type including processing means connected for deploying occupant protection means, said seat occupant sensing system comprising:

a vehicle seat comprising an elastomeric foam filled seat cushion supported by a cushion support, said cushion support comprising an element rotatable about an axis, said seat occupant sensing system also comprising torque sensing means connected with said element for receiving torque therefrom, and wherein:

said cushion engaging said element for being responsive to applied vertical force by applying torque about said axis to said element, said torque sensing means providing a torque signal indicating said torque received from said element, there being an area on said cushion such that said torque sensing means responds increasingly to vertical force applied to locations in said area as said locations are located increasingly toward the rear of the vehicle, and said processing means being connected with said torque sensing means for receiving said torque signal and considering said received torque when deploying said occupant protection means.

21. The invention as defined by claim 20 wherein:

said torque sensing means comprises fluid and means for converting said torque from said cushion to pressure in said fluid and pressure sensing means for providing an electric signal indicating said pressure, said electric signal thereby being said torque signal, and said processing means being connected with said pressure sensing means for receiving said torque signal and considering said torque signal when deploying said occupant protection means.

22. The invention as defined by claim 21 wherein:

said means for converting said torque from said cushion to pressure in said fluid comprises means to convert said torque from cushion to force applied to a bottle containing said fluid and having a neck, a shoulder, sides and a base; said sides joining said shoulder to said base, and said sides being sufficiently compressible that the preponderance of said force applied to a bottle is resisted by pressure in said fluid and not by said sides of said bottle when said force applied to a bottle is applied between said shoulder and said base.

23. The invention as defined by claim 22 wherein:

said sides are formed in a bellows shape.

24. A seat occupant sensing system for an occupant protection system of a vehicle of the type including processing means connected for deploying occupant protection means, said seat occupant sensing system comprising:

a vehicle seat comprising a frame, said frame being rotatable about an axis, said seat comprising means responsive to force applied to said seat by applying torque to said frame about said axis, said seat occupant sensing system also comprising torque sensing means responsive to torque about said axis, said torque sensing means comprising force sensing means connected with said frame at a predetermined distance from said axis for receiving force from said frame, and wherein:

said force sensing means being responsive to force directed perpendicular to said axis and perpendicular to a vector in the direction of said distance by providing a torque signal indicating torque about said axis, there being an area on said seat such that said torque sensing means responds increasingly to vertical force applied to locations in said area as said locations are located increasingly toward the rear of the vehicle, and said processing means being connected with said force sensing means for receiving said torque signal and considering said torque about said axis when deploying said occupant protection means.

25. The invention as defined by claim 24 wherein:

said force sensing means comprises fluid and means for converting said force received from said frame to pressure in said fluid and pressure sensing means for providing an electric signal indicating said pressure, said electrical signal thereby being said torque signal, and said processing means being connected with said pressure sensing means for receiving said torque signal and considering said torque signal when deploying occupant protection apparatus.

26. The invention as defined by claim 25 wherein:

said means for converting said force to pressure in said fluid comprises a bottle having a neck, a shoulder, sides and a base; said sides joining said shoulder to said base, and said sides being sufficiently compressible that the preponderance of said force is resisted by pressure in said fluid when said force is applied between said shoulder and said base and not by said sides of said bottle.

27. The invention as defined by claim 26 wherein:

said sides are formed in a bellows shape.

28. The invention as defined by claim 25, and including a base connected with said force sensing means for resisting movement of said force sensing means in a first direction, a force applying means connected with said frame for receiving force therefrom and connected with said sensing means for applying force thereto in said first direction, and including low friction bearing means engaging both said base and said force applying means for providing unidirection low friction movement therebetween.

29. The invention as defined by claim 28 wherein:

said low friction means comprises bearing balls.

30. The invention as defined by claim 28 and including:

a retaining washer for engaging said force applying means for limiting movement of said force applying means when said frame applies force to said force applying means in a direction opposite said first direction.

31. A seat occupant weight sensing system for an occupant protection system of a vehicle of the type including processing means connected for deploying occupant protection means, said seat occupant weight sensing system comprising:

a vehicle seat, said seat comprising signal generating means responsive to force applied to said seat by providing a signal indicating force applied to said seat, there being a forward location such that said signal generating means is minimally responsive to vertical force applied to said forward location, said signal generating means being increasingly responsive to vertical force applied to locations on said seat as said locations are located increasingly toward the rear of the vehicle from said forward location, and said processing means being connected with said signal generating means for receiving said signal and considering said signal when deploying said occupant protection means.

* * * * *